United States Patent
Ataka et al.

(10) Patent No.: US 9,321,685 B2
(45) Date of Patent: Apr. 26, 2016

(54) GYPSUM COMPOSITION, GYPSUM SLURRY, GYPSUM HARDENED BODY, GYPSUM-BASED BUILDING MATERIAL, GYPSUM BOARD, AND MANUFACTURING METHOD FOR A GYPSUM-BASED BUILDING MATERIAL

(71) Applicant: YOSHINO GYPSUM CO., LTD., Tokyo (JP)

(72) Inventors: Yuji Ataka, Tokyo (JP); Yosuke Sato, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 0 days.

(21) Appl. No.: 14/425,068

(22) PCT Filed: May 21, 2013

(86) PCT No.: PCT/JP2013/064125
§ 371 (c)(1),
(2) Date: Mar. 2, 2015

(87) PCT Pub. No.: WO2014/041854
PCT Pub. Date: Mar. 20, 2014

(65) Prior Publication Data
US 2015/0225293 A1    Aug. 13, 2015

(30) Foreign Application Priority Data

Sep. 12, 2012  (JP) ................. 2012-200953

(51) Int. Cl.
| C04B 28/14 | (2006.01) |
| C04B 11/00 | (2006.01) |
| B28C 1/06 | (2006.01) |
| C04B 111/00 | (2006.01) |

(52) U.S. Cl.
CPC . *C04B 11/00* (2013.01); *B28C 1/06* (2013.01); *C04B 28/14* (2013.01); *C04B 2111/0062* (2013.01); *C04B 2111/00612* (2013.01)

(58) Field of Classification Search
CPC .... C04B 11/00; C04B 24/003; C04B 24/243; C04B 24/38; C04B 28/14; C04B 38/106; C04B 2111/00612; C04B 2111/0062
See application file for complete search history.

(56) References Cited

U.S. PATENT DOCUMENTS

| 2,487,036 | A | 11/1949 | Wise |
| 5,085,929 | A | 2/1992 | Bruce et al. |
| 7,208,068 | B2 * | 4/2007 | Nisogi ................ D21H 19/36 162/135 |
| 7,682,438 | B2 * | 3/2010 | Song .................. B41M 5/0035 106/214.1 |
| 2003/0084980 | A1 | 5/2003 | Seufert et al. |
| 2006/0243171 | A1 | 11/2006 | Yu et al. |
| 2006/0278133 | A1 | 12/2006 | Yu et al. |
| 2007/0125267 | A1 | 6/2007 | Song et al. |
| 2010/0075167 | A1 | 3/2010 | Gilley et al. |
| 2010/0203317 | A1 | 8/2010 | Sahay |
| 2012/0167805 | A1 | 7/2012 | Wittbold et al. |
| 2013/0011553 | A1 * | 1/2013 | Muramatsu ............ B41M 5/52 427/209 |

FOREIGN PATENT DOCUMENTS

| GB | 653638 | 5/1951 |
| JP | H04-505601 | 10/1992 |
| JP | H08-310114 | 11/1996 |
| JP | 2004-090396 | 3/2004 |
| JP | 2004-262232 | 9/2004 |
| JP | 2005-271444 | 10/2005 |
| JP | 2008-543705 | 12/2008 |
| JP | 2009-513843 | 4/2009 |
| WO | 9908978 | 2/1999 |
| WO | 2006135707 | 12/2006 |
| WO | 2011/122599 | 10/2011 |
| WO | WO 2011/122599 A1 * | 10/2011 |

OTHER PUBLICATIONS

Machine Translation of Japanese Patent Specification No. JP 2004-262232 (Sep. 2004).*
Machine Translation of Japanese Patent Specification No. JP 2005-271444 (Oct. 2005).*
International Search Report mailed on Jul. 30, 2013.
Extended European Search Report mailed Nov. 11, 2015.

* cited by examiner

*Primary Examiner* — Anthony J Green
(74) *Attorney, Agent, or Firm* — IPUSA, PLLC

(57) ABSTRACT

A gypsum composition includes a calcined gypsum and a starch urea phosphate.

13 Claims, 3 Drawing Sheets

500 μm

500 μm

GYPSUM COMPOSITION, GYPSUM SLURRY, GYPSUM HARDENED BODY, GYPSUM-BASED BUILDING MATERIAL, GYPSUM BOARD, AND MANUFACTURING METHOD FOR A GYPSUM-BASED BUILDING MATERIAL

TECHNICAL FIELD

The present invention relates to a gypsum composition, a gypsum slurry, a gypsum hardened body, a gypsum-based building material, a gypsum board, and a manufacturing method for a gypsum-based building material.

BACKGROUND ART

Conventionally, a gypsum-based building material such as a gypsum board, a reinforced gypsum board, a normal hard gypsum board, a glass mat gypsum board, a glass-fiber-non-woven-fabric-containing gypsum plate, or a slug gypsum plate has an excellent performance in a fireproof property or fire resistance, a sound insulation property, a construction property, an economical property, and the like, and hence, has been used widely.

Such a gypsum-based building material is usually manufactured by adding water, etc., to, and mixing by a mixer, a gypsum composition wherein a calcined gypsum and a variety of additives are mixed preliminarily, to provide a gypsum slurry (plaster slurry), and shaping into a predetermined shape, subsequently drying, and cutting, such a gypsum slurry and a base paper for board, a glass mat, a glass fiber nonwoven fabric or the like.

A gypsum-based building material is such that its lightweight property depends on an amount of gypsum and an amount of a bubble or void in a gypsum hardened body that is mainly used as a core material. For this reason, an amount of gypsum is decreased, that is, an amount or proportion of an occupying bubble or void is increased, so that it is possible to reduce a total specific gravity of, and attain a light weight of, a gypsum-based building material.

However, a physical strength of a gypsum hardened body that composes a gypsum-based building material is reduced as its specific gravity is reduced. For this reason, with respect to a gypsum board wherein a gypsum hardened body is a core material and a base paper for board is used as a surface material, a gypsum plate wherein a gypsum hardened body is a core material and a glass mat is used as a surface material, or a gypsum plate wherein a gypsum hardened body is a core material and a glass fiber nonwoven fabric (glass tissue) is embedded in a surface thereof, a strength of a gypsum board or gypsum plate is also reduced as a specific gravity of a gypsum hardened body that is a core material is reduced.

Patent Document 1 discloses, as an example, a gypsum hardened body with a low specific gravity that is provided by increasing and homogenizing diameters of added bubbles to provide good spherical shapes when bubbles are added to a gypsum slurry wherein a gypsum composition and water are mixed.

However, a strength of a gypsum hardened body could not have been sufficiently high, even by a method disclosed in Patent Document 1.

Furthermore, compounding a starch has been studied for a purpose of improving a strength of a gypsum hardened body. In particular, Patent Document 2 discloses, as an example, that a strength of a gypsum hardened body with a low specific gravity is drastically improved by using a pregelatinized starch.

However, as a pregelatinized starch is used, a state of bubbles added for fabricating a gypsum hardened body with a low specific gravity is such that a bubble with a large diameter and a bubble with a small one are mixed and a bubble with a large diameter is in a deformative state. Such a deformative state of a bubble has been known as, for example, a precursory phenomenon for partially releasing of a gypsum hardened body and a base paper for board on a surface thereof when a gypsum board is provided, and in such a case, there is a problem in that blistering is caused on a surface of a gypsum board.

Furthermore, as a pregelatinized starch is compounded, an amount of water needed for mixing a gypsum composition with water is drastically increased, so that there is also a problem in that cost for drying of a gypsum hardened body is increased.

Moreover, even if an amount of added pregelatinized starch is increased, an effect of strength improvement is caused to plateau when such an amount for addition is a certain amount or more, so that there is also a problem in that it is not possible to sufficiently deal with an application that requires, in particular, attainment of both a light weight and a strength.

PRIOR ART DOCUMENTS

Patent Documents

Patent Document 1: Japanese Laid-Open Patent Application No. Heisei 04-505601 official gazette Patent Document 2: Japanese published Patent Application No. 2008-543705 official gazette

SUMMARY OF THE INVENTION

Problems to be Solved by the Invention

The present invention aims at providing a gypsum composition capable of obtaining a gypsum hardened body with a high strength without drastically increasing an amount of added water when a gypsum slurry is provided, while a problem in a conventional technique as described above is taken into consideration.

Means for Solving the Problem

The present invention provides a gypsum composition that includes a calcined gypsum and a starch urea phosphate to solve a problem as described above.

Effects of the Invention

According to the present invention, it is possible to provide a gypsum composition so that it is possible to obtain a gypsum hardened body with a high strength without drastically increasing an amount of added water when a gypsum slurry is provided.

EMBODIMENTS FOR IMPLEMENTING THE INVENTION

Figure 1:
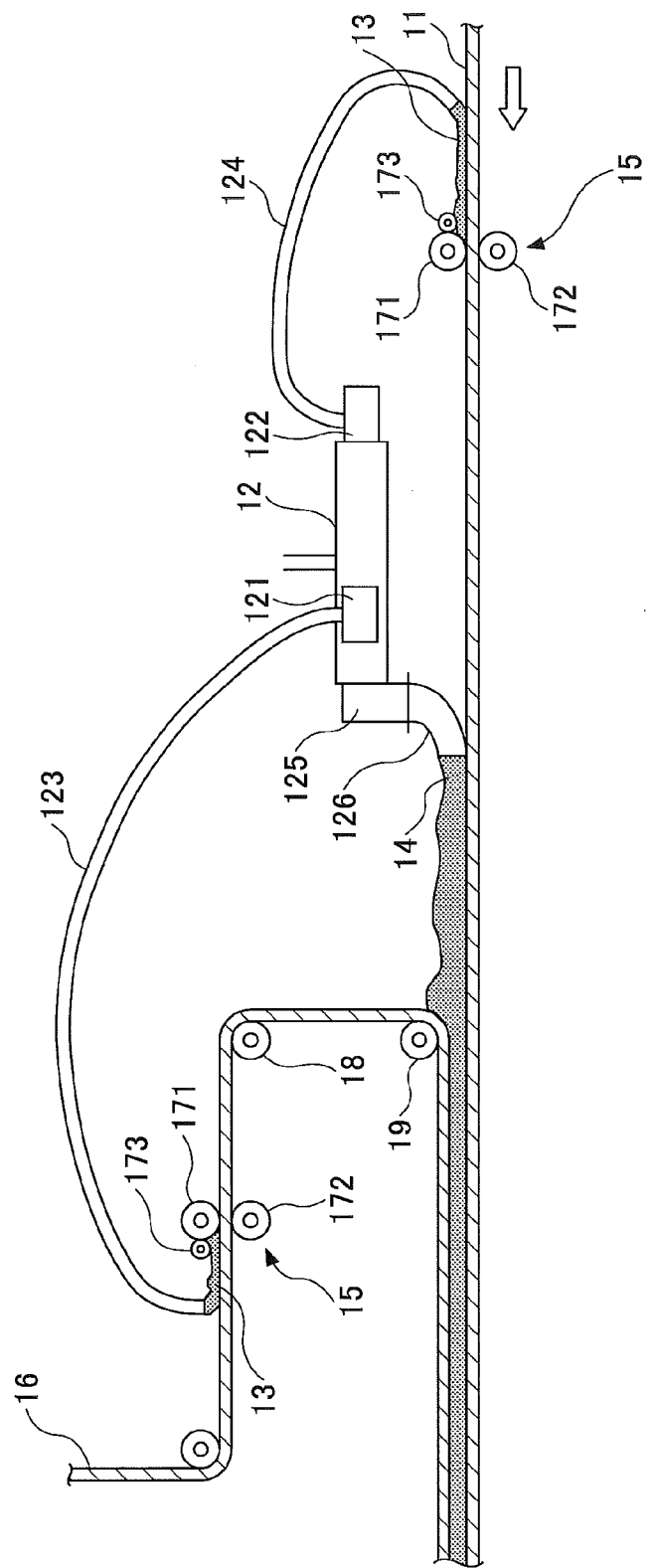
FIG. 1 an illustration diagram of a manufacturing method for a gypsum board in a third embodiment according to the present invention FIG. 2 a relationship between an amount of added starch and a compressive strength in Experimental Example 2.

Although an embodiment for implementing the present invention will be described below, the present invention is not limited to an embodiment described below, and it is possible to apply a variety of modifications and substitutions to the embodiment described below without departing from the scope of the present invention.

A First Embodiment

A gypsum composition and a gypsum slurry (plaster slurry) in the present embodiment will be described.

A gypsum composition in the present embodiment includes a calcined gypsum and a starch urea phosphate.

Furthermore, a gypsum slurry (plaster slurry) in the present embodiment is obtained by mixing a gypsum composition as described above with water.

A calcined gypsum is also referred to as calcium sulfate hemihydrate and is an inorganic composition that has a hydraulic property. For a calcined gypsum, it is possible to use a single item of a β-type hemihydrate gypsum that is obtained by calcining in atmosphere, or an α-type hemihydrate gypsum that is obtained by calcining in water, a single or mixed gypsum of a natural gypsum, a by-product gypsum, a desulfurized gypsum, and the like, or a mixture thereof. Here, calcining in water includes a case of calcining in steam.

A mixing ratio of a starch urea phosphate to a calcined gypsum is not particularly limited and it is possible to select depending on a strength or the like, that is required in a case where a gypsum hardened body is provided by using such a gypsum composition.

For example, it is preferable for a gypsum composition to include a starch urea phosphate at a proportion greater than or equal to 0.2 parts by mass and less than or equal to 10 parts by mass relative to 100 parts by mass of a calcined gypsum. This is because it may be impossible to provide a sufficient strength if a proportion of a starch urea phosphate is less than 0.2 parts by mass. Furthermore, it is possible to provide a sufficient strength in a case where a proportion of a starch urea phosphate is less than or equal to 10 parts by mass, and hence, if a starch urea phosphate is contained in such a manner that a proportion thereof is greater than 10 parts by mass, there may be an unfavorable case in relationship with cost thereof.

Furthermore, it is more preferable for a gypsum composition to include a starch urea phosphate at a proportion greater than or equal to 0.2 parts by mass and less than or equal to 5 parts by mass relative to 100 parts by mass of a calcined gypsum. This is because, for example, a condition of a first class of pyrogenicity that is stipulated in JIS A 6901 may not be satisfied in a case where a gypsum board with a thickness of 12.5 mm is provided, if a proportion of a starch urea phosphate is greater than 5 parts by mass. In a case where a gypsum composition is used as a gypsum-based building material, an incombustibility as well as a strength are frequently required for its performance, and it is preferable to select an amount for its addition according to a need.

Furthermore, it is also possible to add, to a gypsum composition, a variety of additives such as an adhesion improver, a reinforcement fiber, a lightweight aggregate, a fire resisting material, a setting adjustor, a water-reducing agent, and a bubble diameter adjustor, other than a calcined gypsum and a starch urea phosphate.

Then, it is possible to provide a gypsum slurry (plaster slurry) by mixing a gypsum composition as described in the present embodiment with water as described above. An amount of water to be added to a gypsum composition when a gypsum slurry is manufactured is not particularly limited, and it is possible to select depending on a required fluidity or the like. Furthermore, it is also possible to add thereto a variety of additives such as an adhesion improver or a bubble according to a need.

An amount of water that is needed for mixing a gypsum composition with water, etc., to provide a gypsum slurry (plaster slurry) is not greatly changed depending on presence or absence of containment of a starch urea phosphate. For this reason, an amount of heat necessary for drying is also not greatly changed depending on presence or absence of containment of a starch urea phosphate, and it is possible to obtain a gypsum hardened body with a high strength without increasing cost for drying.

In a case where a gypsum hardened body is manufactured by adding water, a bubble, etc., to, and mixing and hardening, a gypsum composition as described above, a starch urea phosphate that is included in a gypsum composition has a function of increasing a strength of a gypsum hardened body. For this reason, it is possible to increase a strength of a gypsum hardened body obtained by using such a gypsum composition.

Moreover, a starch urea phosphate that is included in a gypsum composition has a function of keeping a shape of a bubble in a gypsum slurry and a gypsum hardened body when a gypsum hardened body is manufactured by adding a bubble to a gypsum slurry (plaster slurry).

For this reason, a bubble in a gypsum slurry (plaster slurry) is in a good spherical form due to addition of bubbles with approximately uniform diameters, and further, a shape of a bubble in a gypsum hardened body is kept to be in a good spherical form so that it is possible to provide approximately uniform diameters thereof.

Then, in a case where a shape of a bubble in a gypsum hardened body is in a good spherical form and diameters thereof are approximately uniform, it is possible to increase a strength of a gypsum hardened body in addition to an effect of a light weight.

Furthermore, a strength of an obtained gypsum hardened body also exhibits a tendency to increase with an increase of an amount of an added starch urea phosphate. For this reason, it is possible for a gypsum hardened body to attain a light weight thereof and have a high strength by adjusting an amount of an added starch urea phosphate.

As described above, according to a gypsum composition in the present embodiment, it is possible to provide a gypsum slurry (plaster slurry) that has a target fluidity without drastically increasing an amount of added water as compared with a gypsum composition that does not include a starch urea phosphate.

Furthermore, in a case where a gypsum hardened body is manufactured by using a gypsum composition in the present embodiment, it is possible to increase a strength of a gypsum hardened body due to an action of a starch urea phosphate in a gypsum composition.

Moreover, in a case where a bubble is added when a gypsum hardened body is manufactured, a starch urea phosphate in a gypsum composition has a function of keeping a shape of an added bubble. For this reason, it is possible to maintain a shape or size of a bubble contained in a gypsum hardened body well and increase a strength of such a gypsum hardened body.

Therefore, according to a gypsum composition in the present embodiment, it is possible to obtain a gypsum hardened body so that both a light weight and an increased strength are attained.

A Second Embodiment

In the present embodiment, a gypsum hardened body will be described that uses a gypsum composition as described in the first embodiment.

A gypsum hardened body in the present embodiment is a gypsum hardened body wherein a gypsum composition as described in the first embodiment and water are mixed and subsequently hardened.

Furthermore, a gypsum hardened body may be such that a gypsum composition as described in the first embodiment, a bubble, and water are mixed and subsequently hardened.

Herein, a bubble means a bubble that is fine so as not to impair a quality of a gypsum-based board for building.

When a bubble is added, a bubble is formed by preliminarily adding a foaming agent to water, and stirring while air is incorporated. Then, it is possible to mix a gypsum composition or water and a bubble. Alternatively, it is possible to mix a gypsum composition and water preliminarily to manufacture a gypsum slurry (plaster slurry) and add a bubble to such a gypsum slurry. A foaming agent to be used when a bubble is formed is not particularly limited, and for example, it is possible to provide a sodium alkyl sulfate, an alkyl ether sulfate, a sodium alkyl benzene sulfonate, a polyoxyethylene alkyl sulfate, or the like.

Herein, when a gypsum composition described in the first embodiment, water, and in some cases a bubble, are mixed to provide a gypsum slurry (plaster slurry), a mixing ratio among such a gypsum composition, water, and a bubble is not particularly limited. It is possible to select a mixing ratio among respective components that are included in a gypsum slurry (plaster slurry) by taking into consideration a specific gravity or a strength required in a case where a gypsum hardened body is provided, a fluidity required for a gypsum slurry to manufacture a gypsum board or the like, or the like.

Furthermore, when a gypsum slurry (plaster slurry) is manufactured, it is also possible to add a variety of additives such as an adhesion improver as is also described in the first embodiment, other than a gypsum composition, water, and a bubble as described above. It is possible to add these, depending on a performance required for a gypsum slurry (plaster slurry) or a gypsum hardened body.

For an adhesion improver, it is possible to provide, for example, a publicly known substance such as an oxidized starch or POVAL.

For other additives, it is possible to provide a variety of water-reducing agents, set adjusting agents, bubble diameter adjustors, reinforcement fibers, lightweight aggregates, and the like.

Here, among a variety of additives, it is also possible to preliminarily add a solid one to a gypsum composition, and it is also possible to preliminarily add a liquid one to water that is added to a gypsum composition.

It is possible to shape into a predetermined shape and subsequently harden a gypsum slurry (plaster slurry) that is thus obtained by mixing a gypsum composition, water, and in some cases further a bubble, so that a gypsum hardened body is provided.

A specific gravity of an obtained gypsum hardened body is not limited, and it is possible to select depending on, for example, a weight required in a case where a gypsum-based building material is provided or the like. However, it is preferable for a specific gravity of a gypsum hardened body to be greater than or equal to 0.4 and less than or equal to 0.65 because a strength of a gypsum hardened body is reduced as reducing a specific gravity of such a gypsum hardened body. Furthermore, a case where a specific gravity of a gypsum hardened body is greater than or equal to 0.4 and less than or equal to 0.55 is particularly preferable because it is possible to obtain an effect of the present invention more significantly in that both a light weight and a high strength are attained.

For a specific gravity of a gypsum hardened body, it is possible to provide a desired specific gravity by adjusting an amount of an added bubble or the like when a gypsum slurry (plaster slurry) is manufactured.

In a case where a bubble is added to a gypsum hardened body, a size of a bubble that is included in a gypsum hardened body is not particularly limited. However, it is preferable for an average value of diameters of bubbles included in a gypsum hardened body to be greater than or equal to 100 μm and less than or equal to 1000 μm. It is because, as an average value of diameters of bubbles included in a gypsum hardened body is in a range as described above, a strength of such a gypsum hardened body is higher than a gypsum hardened body with no addition of a bubble and an identical specific gravity.

Furthermore, it is more preferable for an average value of diameters of bubbles included in a gypsum hardened body to be greater than or equal to 200 μm and less than or equal to 800 μm, and moreover, it is particularly preferable to be greater than or equal to 200 μm and less than or equal to 600 μm. This is because, as an average value of diameters of bubbles as described above is in a range as described above, it is possible to further increase a strength of a gypsum hardened body.

For a method for providing a diameter of a bubble included in a gypsum hardened body as a desired size, it is possible to provide a method for selecting a size of a bubble by a foaming machine for foaming a foaming agent, a method for controlling a size of a bubble by a bubble diameter adjustor, or the like.

Furthermore, it is preferable for a shape of a bubble included in a gypsum hardened body to be in a good spherical form.

This is because, as a shape of a bubble included in a gypsum hardened body is in a good spherical form, it is possible to increase a strength of such a gypsum hardened body.

Moreover, it is more preferable for a shape of a bubble included in a gypsum hardened body to be a true sphere or a shape close to a true sphere. This is because, in a case where a shape of a bubble included in a gypsum hardened body is a true sphere or a shape close to a true sphere, it is possible to further increase a strength of such a gypsum hardened body.

As is also described in the first embodiment, a starch urea phosphate that is contained in a gypsum composition has a function of increasing a strength of a gypsum hardened body and a function of keeping a shape of an added bubble.

For this reason, it is possible for a gypsum hardened body as described in the present embodiment to be a gypsum hardened body with a high strength due to a function of a starch urea phosphate itself, and in a case where at least a good spherical bubble, more preferably, a bubble of a true sphere or a shape close to a true sphere (approximately true sphere) is added when a gypsum slurry (plaster slurry) is manufactured, it is possible to further increase a strength of a gypsum hardened body due to a function of a shape of a bubble included in such a gypsum hardened body.

Then, an amount of water that is added when a gypsum composition and water are mixed to provide a gypsum slurry (plaster slurry) is not greatly changed by presence or absence of containment of a starch urea phosphate. For this reason, an amount of heat necessary for drying is also not greatly changed depending on presence or absence of containment of a starch urea phosphate, and it is possible to obtain a gypsum hardened body with a high strength without increasing a cost for drying.

Moreover, a strength of an obtained gypsum hardened body also exhibits a tendency to increase with an increase in an amount of an added starch urea phosphate. For this reason, it is possible to attain a light weight of and provide a gypsum hardened body that has a high strength, by adjusting an amount of an added starch urea phosphate.

A Third Embodiment

In the present embodiment, a gypsum-based building material will be described wherein a gypsum hardened body as described in the second embodiment is a core material thereof.

Herein, a gypsum-based building material is not particularly limited as long as a gypsum hardened body as described in the second embodiment is a core material thereof. For a gypsum-based building material, it is possible to provide, for example, a plate-shaped gypsum-based building material, a block-shaped gypsum-based building material, or the like, such as a gypsum board, a glass mat gypsum board, a glass-fiber-nonwoven-fabric-containing gypsum plate, or a slug gypsum plate.

It is possible to manufacture a gypsum-based building material by, for example, a manufacturing method that includes each of the following steps.

A step of mixing a gypsum composition as described in the first embodiment and water to prepare a gypsum slurry (plaster slurry). At this time, it is also possible to add a variety of additives as described in the second embodiment according to a need.

Then, a step of adding a bubble to such a gypsum slurry. Here, it is also possible not to conduct the present step in a case where a bubble is not added to a gypsum slurry. Furthermore, even in a case where a bubble is added, it is also possible not to conduct the present step but to mix a bubble together in a step of mixing a gypsum composition and water as described above.

Moreover, a step of shaping and hardening depending on each aspect of a gypsum-based building material. It is possible for such a step to include a step of depositing a gypsum slurry (plaster slurry) as described above between surface materials and a step of hardening such a gypsum slurry to provide a gypsum hardened body as a core material. For example, in a case where a target gypsum-based building material is a gypsum board, it is possible to provide a step of depositing a gypsum slurry (plaster slurry) as described above between base papers for board and a step of hardening such a gypsum slurry deposited between such base papers for board. Thereby, it is possible to provide a gypsum board in such a manner that a gypsum hardened body as described in the second embodiment is a core material thereof.

While a case where a gypsum-based building material is a gypsum board is an example, an example of a manufacturing method thereof will more specifically be described below.

FIG. 1 is a side view that partially and schematically illustrates an apparatus for shaping a gypsum board.

A base paper for board (front face cover base paper) 11 that is a surface material is conveyed along a production line from a right side to a left side in the figure.

It is possible to arrange a mixer 12 at a predetermined position associated with a conveyance line, for example, above or laterally to such a conveyance line. Then, a gypsum composition as described in the first embodiment is mixed with water or the like and in some cases, further, an additive such as an adhesion improver, a set adjusting agent, or a water-reducing agent in such a single mixer 12 to manufacture a gypsum slurry (plaster slurry). Furthermore, a bubble is added to a gypsum slurry (plaster slurry) from a fractionation port 121, 122, or 125 according to a need.

Here, although gypsum slurries with a low density and a high density are manufactured by one mixer 12 in FIG. 1 as described below, two mixers may be provided for respectively supplying gypsum slurries with a high density and a low density.

Furthermore, the mixer 12 herein illustrates an example configured in such a manner that it is possible to supply gypsum slurries with a high density and a low density, and is not limited to such an embodiment. For example, an embodiment may be such that one kind of gypsum slurry is manufactured and this is supplied onto a base paper for board 11.

Then, an obtained gypsum slurry with a high density 13 is supplied onto a front face cover base paper 11 and a back face cover base paper 16 through a delivery pipe 123 or 124 at an upstream side in a direction of conveyance for a roll coater 15.

Herein, 171, 172, and 173 indicate an application roll, a receiving roll, and a residue removal roll, respectively. Each of gypsum slurries on the front face cover base paper 11 and the back face cover base paper 16 reaches a spreading part of the roll coater 15 and is spread by such a spreading part. Both a thin layer and a marginal part region of the gypsum slurry with a high density are formed on the front face cover base paper 11. Furthermore, a thin layer of the gypsum slurry with a high density 13 is similarly is formed on the back face cover base paper 16.

The front face cover base paper 11 is conveyed directly, and the back face cover base paper 16 is turned by a turning roller 18 into a direction of a conveyance line for the front face cover base paper 11. Then, both the front face cover base paper 11 and the back face cover base paper 16 reach a shaping machine 19. Herein, a gypsum slurry with a low density 14 is supplied to between thin layers formed on respective base papers 11 and 16 through a pipeline 126 from the mixer 12. A continuous stack is formed that has a three-layer structure that is composed of the front face cover base paper 11, the gypsum slurry with a low density 14, and the back face cover base paper 16, and such a stack is hardened and reaches a (non-illustrated) coarsely cutting cutter. A coarsely cutting cutter cuts a continuous stack into plate-shaped bodies with a predetermined length to form a plate-shaped body that is composed of a gypsum-based core material covered with a base paper, namely, a semi-finished product of a gypsum board. A coarsely cut stack further passes through and is forced-dried in a (non-illustrated) drying machine and subsequently is tailored into products with a predetermined length. Thus, it is possible to manufacture a gypsum board product.

No limitation to a manufacturing method for a gypsum board as described above is provided, and for example, a method for manufacturing a gypsum board by one kind of gypsum slurry may be provided wherein a step of forming a thin layer of a gypsum slurry with a high density as described above is omitted.

Specifically, a gypsum slurry (plaster slurry) is supplied onto and deposited on a front face cover base paper (base paper for board) that is conveyed continuously. A bottom paper is folded along a score provided to each of marginal portions at both ends thereof, so that such a gypsum slurry is surrounded thereby. At this time, a back face cover base paper (base paper for board) that is conveyed at an identical speed is superposed on a gypsum slurry.

Then, shaping is conducted by passing through a shaping machine for determining a thickness and a width of a gypsum board.

After shaping into a gypsum board with a predetermined shape through a step as described above, it is also possible to provide a method for manufacturing a target gypsum board by passing through a coarsely cutting step, a drying step, a tailoring step, or the like, similarly to a manufacturing method for a gypsum board as described above.

Although a gypsum board has herein been described as an example, it is possible to change a base paper for board that is a surface material to a glass fiber nonwoven fabric (glass tissue), a glass mat, or the like, and arrange on a surface or embed near a surface of this one, etc., so as to manufacture a variety of gypsum-based building materials.

A gypsum-based building material, in particular, a gypsum board, wherein a gypsum hardened body as described in the second embodiment is a core material thereof, and a manufacturing method thereof have been described hereinbefore.

According to such a gypsum-based building material and a manufacturing method for a gypsum-based building material, in particular, a gypsum board and a manufacturing method for a gypsum board, it is possible to increase a strength thereof, due to a function of a starch urea phosphate that is included in a gypsum composition that is a raw material, as described in the second embodiment.

Furthermore, when a gypsum hardened body that is a core material is manufactured, a shape of a bubble that is added to a gypsum slurry is in a good spherical form or more preferably a true sphere shape or a shape close to a true sphere, so that it is possible to increase a strength of a gypsum hardened body that is a core material.

Moreover, an amount of water that is needed in a case where a gypsum composition is mixed with water to provide a gypsum slurry (plaster slurry) when a gypsum-based building material is manufactured is not greatly changed depending on presence or absence of containment of a starch urea phosphate. For this reason, an amount of heat that is required in a drying step when a gypsum-based building material is manufactured is also not changed by containing a starch urea phosphate. Therefore, it is possible to obtain a gypsum hardened body with a high strength that is a core material, without increasing a cost for drying. That is, it is possible to obtain a gypsum-based building material with a high strength without increasing a cost for drying.

As described below, a tendency is also exhibited to increase a strength of an obtained gypsum-based building material with an increase of an amount of an added starch urea phosphate. For this reason, it is possible to attain a light weight of and obtain a gypsum hardened body with a high strength by adjusting an amount of an added starch urea phosphate. Then, it is also possible to attain a light weight and a high strength of a gypsum-based building material, because such a gypsum hardened body is possessed as a core material.

PRACTICAL EXAMPLES

Although a description will be provided with specific practical examples below, the present invention is not limited to these practical examples.

(1) An Evaluation Method

Test methods for gypsum compositions, gypsum slurries (plaster slurries), gypsum hardened bodies, and gypsum boards that were manufactured in the following experimental examples will be described.

(1-1) A Flow Test

A flow test was conducted for a gypsum slurry (plaster slurry) that was a mixed product of a gypsum composition and water.

A flow test was such that a gypsum slurry (plaster slurry) was poured into a circular cylinder with a diameter of 8.5 cm and a height of 4 cm so as to be filled therewith, the aforementioned circular cylinder is quickly lifted in a perpendicularly upward direction, and an increased diameter of the aforementioned gypsum slurry was measured.

(1-2) A Compressive Strength Test for a Gypsum Hardened Body

A compressive strength of a fabricated gypsum hardened body was measured by using Autograph (produced by Shimadzu Corporation, model number: AG-10KNI). For a measurement, a rate of loading for Autograph was 3 mm/min.

(1-3) A Compressive Strength Test for a Gypsum Board

A central part of a gypsum board manufactured on a condition described below was cut into 4 cm×4 cm and 3 pieces of cut boards were superposed to provide a test specimen.

A condition for a measurement was provided similarly to the test of (1-2). Specifically, a measurement was conducted by using Autograph (produced by Shimadzu Corporation, model number: AG-10KNI) wherein a rate of loading for Autograph was 3 mm/min.

(1-4) Confirmation of a Shape of a Bubble in a Gypsum Board

A gypsum board was broken or split in such a manner that a cross section thereof is a plane, and such a cross section was observed by a scanning electron microscope (SEM).

(1-5) A Pyrogenicity Test

A pyrogenicity test was conducted in accordance with JIS A 6901:2009 and a total heat value and a maximum heat generation rate were measured for a heating time of 20 minutes.

A test specimen was a square with a one side length of 99 mm±1 mm and was cut out from a central part of a gypsum board. The test specimen was provided by curing before a test in such a manner that a constant mass was provided at a temperature of 23° C.±2° C. and a relative humidity of 50±5%.

(2) A Content of an Experiment

Experimental Examples 1-3 described below were implemented and evaluations were conducted for obtained samples in accordance with the evaluation methods described above.

Experimental Example 1

In the present experimental example, a study was conducted for a flow value of a gypsum slurry that used a gypsum composition.

For respective samples, gypsum compositions were manufactured by mixing a calcined gypsum and a starch urea phosphate or a pregelatinized starch to provide compositions of gypsum compositions illustrated in Table 1 and Table 2. In the tables, sample Nos. 1-1-1-5 were practical examples and samples Nos. 1-6-1-11 were comparative examples.

For the calcined gypsum, a calcined gypsum for gypsum board was used.

Gypsum slurries were manufactured by further mixing respective manufactured gypsum compositions with water so as to provide compositions illustrated in Tables 1 and 2.

TABLE 1

| Sample No. | | | 1-1 | 1-2 | 1-3 |
|---|---|---|---|---|---|
| Composition (part(s) by mass) | Gypsum composition | Calcined gypsum | | 100 | |
| | | Starch urea phosphate | 0.2 | 1.0 | 3.0 |
| | Water | | | 90 | |
| Flow value (mm) | | | 200 | 200 | 190 |
| Sample No. | | | | 1-4 | 1-5 |
| Composition (part(s) by mass) | Gypsum composition | Calcined gypsum | | 100 | |
| | | Starch urea phosphate | | 5.0 | 10 |
| | Water | | | 90 | |
| Flow value (mm) | | | | 190 | 185 |

TABLE 2

| Sample No. | | | 1-6 | 1-7 | 1-8 |
|---|---|---|---|---|---|
| Composition (part(s) by mass) | Gypsum composition | Calcined gypsum | | 100 | |
| | | Pregelatinized starch | 0 | 0.2 | 1.0 |
| | Water | | | 90 | |
| Flow value (mm) | | | 200 | 144 | 130 |
| Sample No. | | | 1-9 | 1-10 | 1-11 |
| Composition (part(s) by mass) | Gypsum composition | Calcined gypsum | | 100 | |
| | | Pregelatinized starch | 3.0 | 5.0 | 10 |
| | Water | | | 90 | |
| Flow value (mm) | | | 120 | Non-mixable | Non-mixable |

Mixing was conducted by using a commercially available blender (produced by SANYO, model number: SM-R50) in such a manner that mixing was conducted for 15 seconds after introducing a gypsum composition.

After manufacturing the gypsum slurries, (1-1) flow test described above was conducted. The results are illustrated in Table 1 in combination. Sample Nos. 1-1-1-5 that used the starch urea phosphate and were practical examples exhibited no or little reduction of flow values thereof or good flow values, as compared with sample No. 1-6 wherein no starch was added. On the other hand, sample Nos. 1-7-1-11 that compounded the pregelatinized starch therein and were comparative examples drastically reduced flow values thereof, as compared with sample No. 1-6 wherein no starch was added, and in particular, sample Nos. 1-10 and 1-11 that were comparative examples were such that gypsum slurries (plaster slurries) had no fluidity and it was not possible for the blender to conduct mixing thereof.

Experimental Example 2

In the present experimental example, gypsum hardened bodies with various kinds of compositions were manufactured and evaluations thereof were conducted.

Gypsum slurries manufactured by mixing water and a set adjusting agent with gypsum compositions that included the calcined gypsum and the starch urea phosphate or the pregelatinized starch at predetermined compositions so as to provide compositions illustrated in Table 3 and Table 4 were put and hardened in formworks with a 2 cm square. After confirming that gypsum slurries had been hardened, formwork removal was conducted, and after drying in a drying machine set at 200° C. for 20 minutes, drying was conducted in a drying machine set at 40° C. until constant masses thereof were provided. Specific gravities of dried gypsum hardened bodies were approximately 0.5.

In Tables 3 and 4, sample Nos. 2-1-2-5 were practical examples and sample Nos. 2-6-2-11 were comparative examples.

Then, a compressive strength test illustrated in (1-2) described above was conducted for respective obtained samples. The results are illustrated in Tables 3 and 4.

For sample Nos. 2-1-2-5 that used the starch urea phosphate, it was possible to confirm that a compressive strength was also improved in proportional to an amount of addition thereof. On the other hand, for sample Nos. 2-7-2-11 that used the pregelatinized starch, improvement of a strength was not found with respect to a case the starch urea phosphate was compounded, and such a difference was significant as an amount of compounding thereof was increased.

Figure 2:
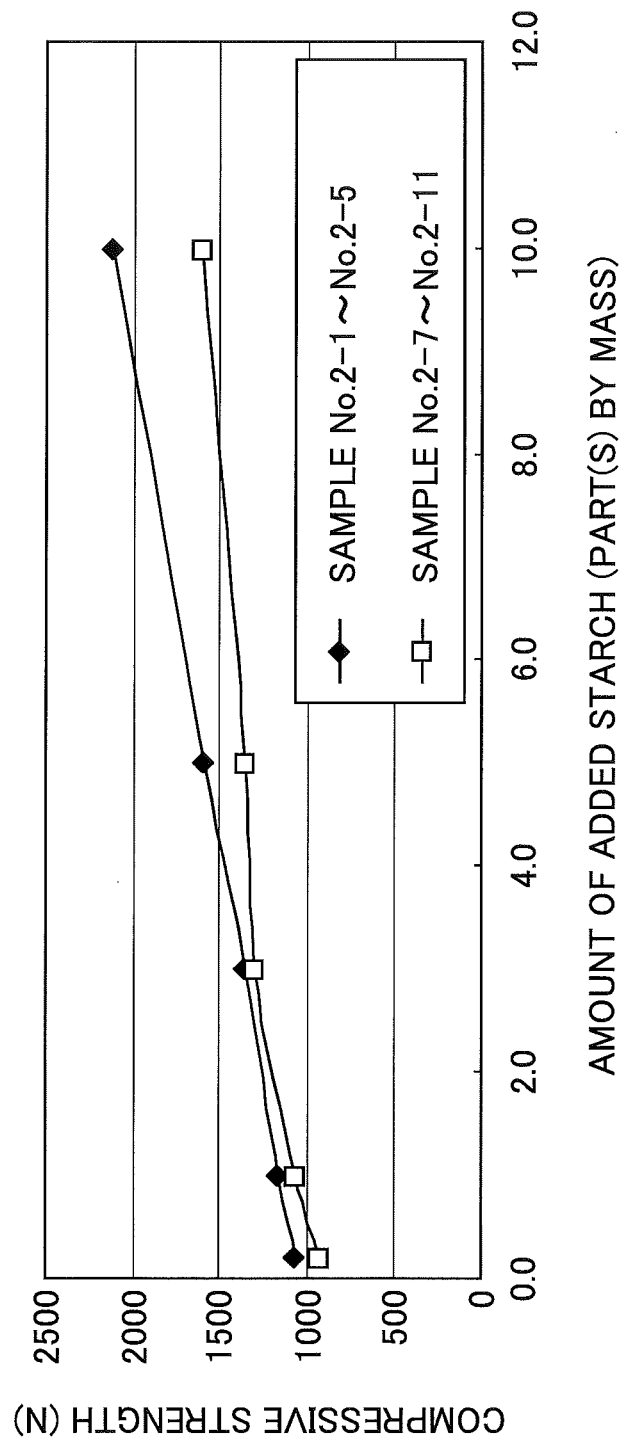

Herein, FIG. 2 illustrates a relationship between an amount of an added starch and a compressive strength for sample Nos. 2-1-2-5 and sample Nos. 2-7-2-11 described above. From this, it was possible to find that a compressive strength of the test specimen that used the starch urea phosphate was increased depending on an amount of addition thereof without causing the compressive strength to plateau in a range of the present experiment whereas improvement of a compressive strength of the test specimen that used the pregelatinized starch tended to plateau in a rage of a high amount of compounding (that was greater than or equal to 5% with respect to the calcined gypsum). That is, it meant that it was possible to add the starch urea phosphate according to a needed compressive strength.

TABLE 3

| Sample No. | | 2-1 | 2-2 | 2-3 |
|---|---|---|---|---|
| Composition (part(s) by mass) | Calcined gypsum | | 100 | |
| | Starch urea phosphate | 0.2 | 1.0 | 3.0 |
| | Set adjusting agent | | 2 | |
| | Water | | 199 | |
| Compressive strength (N) | | 1060 | 1163 | 1358 |
| Sample No. | | | 2-4 | 2-5 |
| Composition (part(s) by mass) | Calcined gypsum | | 100 | |
| | Starch urea phosphate | | 5.0 | 10 |
| | Set adjusting agent | | 2 | |
| | Water | | 199 | |
| Compressive strength (N) | | | 1587 | 2114 |

TABLE 4

| Sample No. | | 2-6 | 2-7 | 2-8 |
|---|---|---|---|---|
| Composition (part(s) by mass) | Calcined gypsum | | 100 | |
| | Pregelatinized starch | 0 | 0.2 | 1.0 |
| | Set adjusting agent | | 2 | |
| | Water | | 199 | |
| Compressive strength (N) | | 691 | 931 | 1071 |
| Sample No. | | 2-9 | 2-10 | 2-11 |
| Composition (part(s) by mass) | Calcined gypsum | | 100 | |
| | Pregelatinized starch | 3.0 | 5.0 | 10 |
| | Set adjusting agent | | 2 | |
| | Water | | 199 | |
| Compressive strength (N) | | 1303 | 1347 | 1599 |

Experimental Example 3

In the present experimental example, gypsum boards that used the gypsum hardened bodies with various kinds of compositions as core materials thereof were manufactured and evaluations thereof were conducted.

Gypsum boards were manufactured in accordance with the following procedures by using gypsum slurries that were manufactured by mixing water, the set adjusting agent, a water-reducing agent, and an adhesion improver to gypsum compositions that included the calcined gypsum and the starch urea phosphate or the pregelatinized starch at a predetermined compositions illustrated in Table 5 and Table 6. In Tables 5 and 6, sample Nos. 3-1-3-5 were practical examples and sample Nos. 3-6-3-11 were comparative examples.

A manufacturing process for a gypsum board will be described by using FIG. 1.

A base paper for board (front face cover base paper) 11 was continuously conveyed along a production line from a right side to a left side in FIG. 1.

A mixer 12 was arranged above or laterally to a conveyance line as illustrated in FIG. 1, and in such a single mixer 12, the gypsum compositions described above were mixed with additives such as water, the adhesion improver, and the set adjusting agent, so as to provide compositions illustrated in Tables 5 and 6 and thereby manufacture gypsum slurries (plaster slurries). At this time, for gypsum slurries with a low density, bubbles were added to the gypsum slurries (plaster slurries) from a fractionation port 125 so as to provide desired specific gravities.

In the mixer 12, obtained gypsum slurries with a high density 13 were supplied onto the front face cover base paper 11 and a back face cover base paper 16 via fractionation ports 121 and 122 and through delivery pipes 123 and 124 at an upstream side in a direction of conveyance of a roll coater 15.

Each of the gypsum slurries on the front face cover base paper 11 and the back face cover base paper 16 reached a spreading part of the roll coater 15 and was spread by the spreading part. Both thin layers and marginal part regions of the gypsum slurries with a high density 13 were formed on the front face cover base paper 11. Furthermore, thin layers of the gypsum slurries with a high density 13 were similarly formed on the back face cover base paper 16.

The front face cover base paper 11 was conveyed directly and the back face cover base paper 16 was turned to a direction of conveyance of the front face cover base paper 11 by a turning roller 18.

Then, both the front face cover base paper 11 and the back face cover base paper 16 reached a shaping machine 19. Herein, bubbles were added from fractionation port 125 of the mixer 12 and the gypsum slurries with a low density 14 were supplied between the thin layers formed on the respective base papers 11 and 16 through a pipeline 126. Continuous stacks having a three-layer structure composed of the front face cover base paper 11, the gypsum slurry with a low density 14, and the back face cover base paper 16 were formed and such stacks were hardened and reached a (non-illustrated) coarsely cutting cutter. The coarsely cutting cutter cut the continuous stacks into plate-shaped bodies with a predetermined length so that the plate-shaped bodies composed of a gypsum-based core material covered with the base papers, namely, semi-finished products of gypsum boards, were formed.

Coarsely cut stacks further passed through and were forced-dried in a (non-illustrated) drying machine and subsequently were tailored into products with a predetermined length. Thus, gypsum boards were manufactured.

The gypsum boards that were manufactured in the manufacturing process described above were shaped in such a manner that thicknesses thereof were 12.5 mm.

Furthermore, for used base papers for board, one with 200 g/m$^2$ was used for any of the front face cover base paper and the back face cover base paper. Gypsum slurries that were raw materials of the gypsum boards were such that 70% of mixing water, 0.5% of the adhesion improver, 1% of the set adjusting agent, 0.3% of the water-reducing agent, and a predetermined amount of the starch urea phosphate or pregelatinized starch were compounded into and mixed with 100 parts by mass of the calcined gypsum as illustrated in Tables 5 and 6. For the gypsum slurries with a low density, bubbles were further added in such a manner that specific gravities thereof were 0.5.

Then, test specimens were fabricated by using gypsum board pieces that were cut out from central parts of the manufactured gypsum boards into a predetermined size and the respective tests described in (1-3)-(1-5) were conducted. Here, with respect to (1-4) confirmation of a shape of a bubble in a gypsum board, confirmation was conducted for test specimens of sample No. 3-3 and No. 3-9 wherein 3% of the starch urea phosphate or the pregelatinized starch was added therein. Furthermore, with respect to (1-5) a pyrogenicity test, a test was conducted for test specimens of sample Nos. 3-1-3-5 wherein the starch urea phosphate was added therein.

The results are illustrated in Tables 5 and 6. Compressive strengths of specimens of sample Nos. 3-1-3-5 that used gypsum board pieces manufactured by using the starch urea phosphate were higher strengths as compared with compressive strengths of specimens of sample Nos. 3-6-3-11 that used gypsum board pieces manufactured by using an identical amount of the pregelatinized starch.

Furthermore, also in the present experimental example, whereas improvement of strength of the test specimen that used the pregelatinized starch tended to plateau in a range of a high amount of compounding (that was greater than or equal to 5% with respect to the calcined gypsum), there was not such a tendency in test specimens that used the starch urea phosphate. That is, it meant that it was possible to add the starch urea phosphate according to a needed strength.

For the pyrogenicity test, a total heat value and a maximum heat generation rate were 8.0 MJ/m$^2$ and 100 kW/m$^2$, respectively, in a case where an amount of the compounded starch urea phosphate was less than or equal to 5.0 parts by mass per 100 parts by mass of the calcined gypsum in the gypsum boards of sample Nos. 3-1-3-5 that used the starch urea phosphate, so that conditions of first class pyrogenicity as provided in JIS A 6901 were satisfied even in a case a base paper for board with a comparatively high weight was used.

Figure 3:
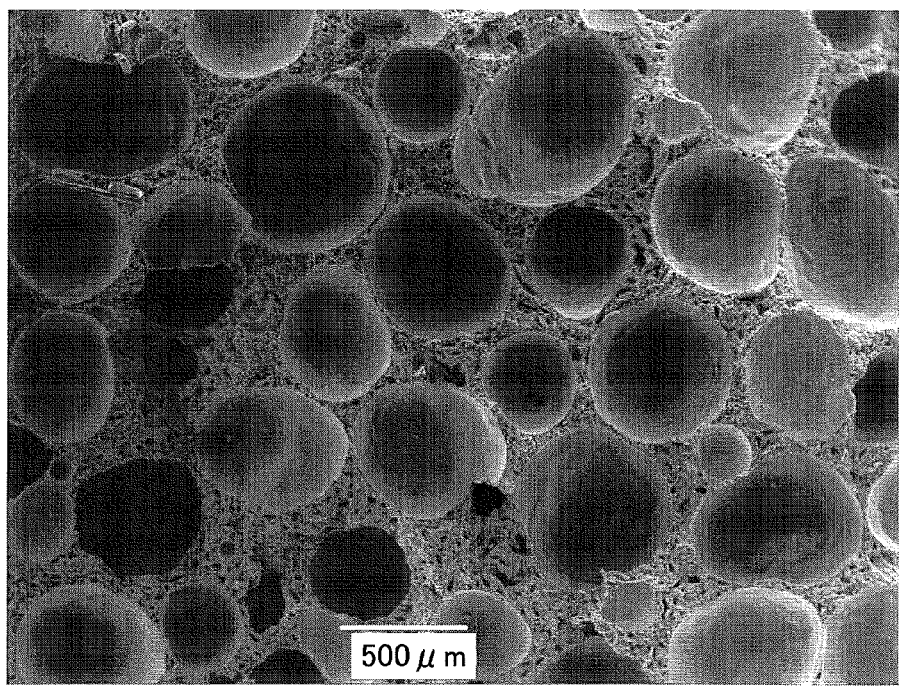
FIG. 3 an SEM photograph of a gypsum hardened body at a low specific gravity part of a gypsum board (Sample No. 3-3) in Experimental Example 3
Figure 4:
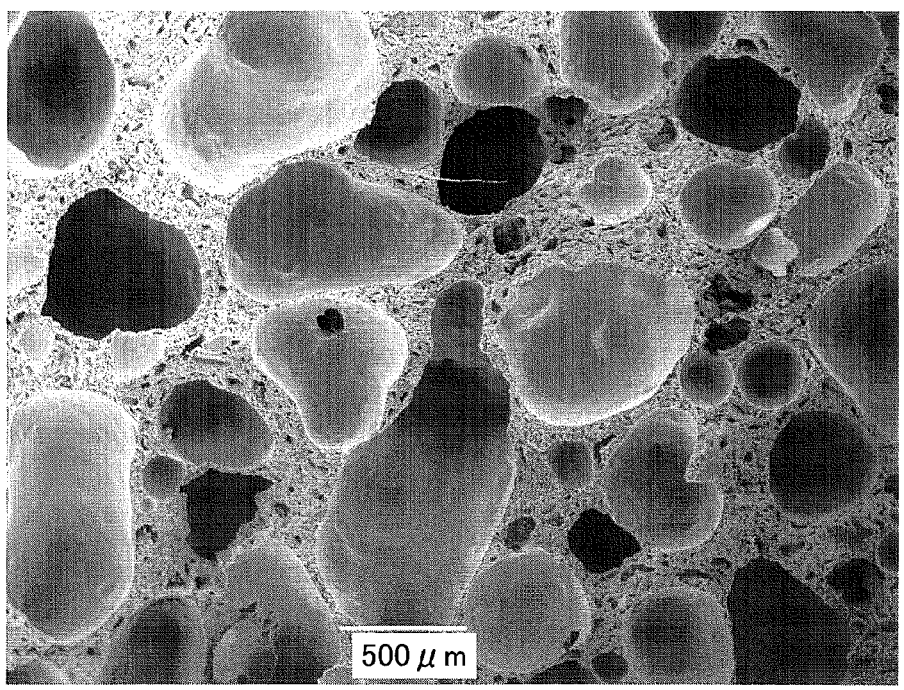
FIG. 4 an SEM photograph of a gypsum hardened body at a low specific gravity part of a gypsum board (Sample No. 3-9) in Experimental Example 3

FIG. 3 and FIG. 4 illustrate SEM photographs of gypsum hardened bodies in low-specific-weight parts (low density parts) of the gypsum boards of sample No. 3-3 and No. 3-9. FIG. 3 is an SEM photograph for sample No. 3-3 and FIG. 4 is an SEM photograph for sample No. 3-9.

According to this, sample No. 3-3 wherein the starch urea phosphate was compounded held bubbles of approximately true spheres with approximately uniform diameters whereas sample No. 3-9 wherein the pregelatinized starch was compounded was provided in a state such that a deformed bubble was present and a bubble with a large diameter and a bubble with a small one are mixed, and in a risky state such that there was a high possibility of causing a blister on a surface of the gypsum board.

TABLE 5

| Sample No. | | 3-1 | 3-2 | 3-3 |
|---|---|---|---|---|
| Composition (part(s) by mass) | Calcined gypsum | | 100 | |
| | Starch urea phosphate | 0.2 | 1.0 | 3.0 |
| | Set adjusting agent | | 1 | |
| | Water-reducing agent | | 0.3 | |
| | Adhesion improver | | 0.5 | |
| | Water | | 70 | |
| Compressive strength (N) | | 2680 | 3104 | 3232 |
| Pyrogenicity test | Total heat value (MJ/m$^2$) | 5.0 | 4.5 | 7.0 |
| | Maximum heat generation rate (kW/m$^2$) | 55 | 60 | 80 |
| | Pyrogenicity: 1st class | ○ | ○ | ○ |

| Sample No. | | 3-4 | 3-5 |
|---|---|---|---|
| Composition (part(s) by mass) | Calcined gypsum | | 100 |
| | Starch urea phosphate | 5.0 | 10 |
| | Set adjusting agent | | 1 |
| | Water-reducing agent | | 0.3 |
| | Adhesion improver | | 0.5 |
| | Water | | 70 |
| Compressive strength (N) | | 3708 | 4976 |
| Pyrogenicity test | Total heat value (MJ/m$^2$) | 8.0 | 10.5 |
| | Maximum heat generation rate (kW/m$^2$) | 100 | 115 |
| | Pyrogenicity: 1st class | ○ | X |

TABLE 6

| Sample No. | | 3-6 | 3-7 | 3-8 |
|---|---|---|---|---|
| Composition (part(s) by mass) | Calcined gypsum | | 100 | |
| | Pregelatinized starch | 0 | 0.2 | 1.0 |
| | Set adjusting agent | | 1 | |
| | Water-reducing agent | | 0.3 | |
| | Adhesion improver | | 0.5 | |
| | Water | | 70 | |
| Compressive strength (N) | | 2480 | 2548 | 2648 |

| Sample No. | | 3-9 | 3-10 | 3-11 |
|---|---|---|---|---|
| Composition (part(s) by mass) | Calcined gypsum | | 100 | |
| | Pregelatinized starch | 3.0 | 5.0 | 10 |
| | Set adjusting agent | | 1 | |
| | Water-reducing agent | | 0.3 | |
| | Adhesion improver | | 0.5 | |
| | Water | | 70 | |
| Compressive strength (N) | | 2984 | 3472 | 3868 |

The present international application claims priority based on Japanese Patent Application No. 2012-200953 filed Sep. 12, 2012, and entire contents of Japanese Patent Application No. 2012-200953 are herein incorporated by reference for the present international application.

APPENDIX

Illustrative Embodiment (1) is a gypsum composition including a calcined gypsum and a starch urea phosphate.

Illustrative Embodiment (2) is the gypsum composition as described in Illustrative Embodiment (1), wherein the starch urea phosphate is included at a proportion greater than or equal to 0.2 parts by mass and less than or equal to 10 parts by mass relative to 100 parts by mass of the calcined gypsum.

Illustrative Embodiment (3) is a gypsum slurry, wherein the gypsum composition as described in Illustrative Embodiment (1) or (2) is mixed with water.

Illustrative Embodiment (4) is a gypsum hardened body, wherein the gypsum composition as described in Illustrative Embodiment (1) or (2) is mixed with water and subsequently hardened.

Illustrative Embodiment (5) is a gypsum hardened body, wherein the gypsum composition as described in Illustrative Embodiment (1) or (2) is mixed with a bubble and water and subsequently hardened.

Illustrative Embodiment (6) is the gypsum hardened body as described in Illustrative Embodiment (4) or (5) wherein a specific gravity thereof is greater than or equal to 0.4 and less than or equal to 0.65.

Illustrative Embodiment (7) is a gypsum-based building material, wherein the gypsum hardened body as described in any one of Illustrative Embodiments (4) to (6) is a core material thereof.

Illustrative Embodiment (8) is a gypsum board, wherein the gypsum hardened body as described in any one of Illustrative Embodiments (4) to (6) is a core material thereof.

Illustrative Embodiment (9) is a manufacturing method for a gypsum-based building material, including: a step of mixing the gypsum composition as described in Illustrative Embodiment (1) or (2) with water to prepare a gypsum slurry; a step of adding a bubble to the gypsum slurry; a step of depositing the gypsum slurry between surface materials; and a step of hardening the gypsum slurry to provide a gypsum hardened body as a core material.

The invention claimed is:

1. A gypsum composition including a calcined gypsum and a starch urea phosphate, wherein the starch urea phosphate is included at a proportion greater than or equal to 0.2 parts by mass and less than or equal to 10 parts by mass relative to 100 parts by mass of the calcined gypsum.

2. A gypsum slurry, wherein the gypsum composition as claimed in claim 1 is mixed with water.

3. A gypsum hardened body, wherein the gypsum composition as claimed in claim 1 is mixed with water and subsequently hardened.

4. A gypsum hardened body comprising:
a gypsum composition including a calcined gypsum and a starch urea phosphate,
wherein the gypsum composition is mixed with an air entraining agent and water and subsequently hardened.

5. The gypsum hardened body as claimed in claim 4 wherein a specific gravity thereof is greater than or equal to 0.4 and less than or equal to 0.65.

6. A gypsum-based building material, wherein the gypsum hardened body as claimed in claim 4 is a core material thereof.

7. A gypsum board, wherein the gypsum hardened body as claimed in claim 4 is a core material thereof.

8. A gypsum-based building material, wherein the gypsum hardened body as claimed in claim 5 is a core material thereof.

9. A gypsum board, wherein the gypsum hardened body as claimed in claim 5 is a core material thereof.

10. A gypsum hardened body comprising:
a gypsum composition including a calcined gypsum and a starch urea phosphate,
wherein the gypsum composition is mixed with water and subsequently hardened, and
wherein a specific gravity thereof is greater than or equal to 0.4 and less than or equal to 0.65.

11. A gypsum-based building material comprising:
a gypsum composition including a calcined gypsum and a starch urea phosphate,
wherein the gypsum composition is mixed with water and subsequently hardened to form a gypsum hardened body, and
wherein the gypsum hardened body is a core material thereof.

12. A gypsum board comprising:
a gypsum composition including a calcined gypsum and a starch urea phosphate,
wherein the gypsum composition is mixed with water and subsequently hardened to form a gypsum hardened body, and
wherein the gypsum hardened body is a core material thereof.

13. A manufacturing method for a gypsum-based building material, including:
a step of mixing the gypsum composition including a calcined gypsum and a starch urea phosphate with water to prepare a gypsum slurry;
a step of adding a bubble to the gypsum slurry;
a step of depositing the gypsum slurry between surface materials; and
a step of hardening the gypsum slurry to provide a gypsum hardened body as a core material.

* * * * *